(12) United States Patent
Perez Martinez et al.

(10) Patent No.: US 8,949,928 B2
(45) Date of Patent: Feb. 3, 2015

(54) METHOD FOR PERSONALIZING PARENTAL CONTROL IN A PCC ARCHITECTURE

(75) Inventors: Alfonso de Jesus Perez Martinez, Madrid (ES); Juan Ignacio Perez Andres, Madrid (ES); Rodrigo Alvarez Dominguez, Madrid (ES); Luis Campo Giralte, Madrid (ES); Jose Rubio Vidales, Torrelodones (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 13/166,275

(22) Filed: Jun. 22, 2011

(65) Prior Publication Data

US 2012/0331516 A1    Dec. 27, 2012

(51) Int. Cl.
*G06F 17/00* (2006.01)
(52) U.S. Cl.
USPC ............................................................ 726/1
(58) Field of Classification Search
USPC ............................................................ 726/1
See application file for complete search history.

(56) References Cited

U.S. PATENT DOCUMENTS

| 2004/0003071 | A1* | 1/2004 | Mathew et al. ............... 709/223 |
| 2010/0235877 | A1* | 9/2010 | Hu et al. ............................ 726/1 |
| 2011/0022702 | A1* | 1/2011 | Riley et al. .................... 709/224 |
| 2011/0225281 | A1* | 9/2011 | Riley et al. .................... 709/223 |
| 2011/0283311 | A1* | 11/2011 | Luong ............................. 725/28 |
| 2011/0314145 | A1* | 12/2011 | Raleigh et al. ................ 709/224 |
| 2012/0136992 | A1* | 5/2012 | Lopez Nieto et al. ........ 709/224 |

* cited by examiner

*Primary Examiner* — Esther Benoit

(57) ABSTRACT

A Parental Control Manager "PCM" server of a Policy and Charging Control "PCC" architecture with the Parental Control Manager "PCM" server, a Policy Control Enforcement Function device with Deep Packet Inspection capabilities "PCEF-DPI device", and a Policy Control Rules Function "PCRF" server. The PCM server includes a user interface unit for receiving a logon from a user, and for receiving from the user monitoring criteria on Internet traffic types to be monitored for the user, and corresponding actions to be carried out when any monitoring criteria fit a given Internet traffic type. The PCM server includes a network interface unit for submitting the monitoring criteria and corresponding actions received from the user to a PCRF server. A PCRF server of a PCC architecture with a PCM server, a PCEF-DPI device, and the PCRF server. A PCEF-DPI device of a PCC architecture with a PCM server, the PCEF-DPI device, and a PCRF server. A method of parental control by a user for access to websites, multimedia contents and Internet services with a PCC architecture having a PCM server, a PCEF-DPI device, and a PCRF server.

23 Claims, 6 Drawing Sheets

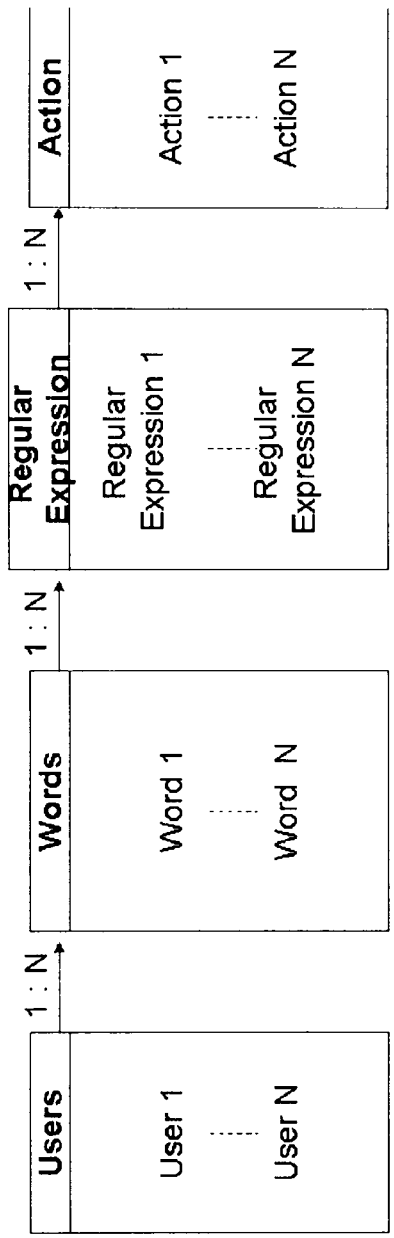

METHOD FOR PERSONALIZING PARENTAL CONTROL IN A PCC ARCHITECTURE

TECHNICAL FIELD

The present invention is related to parental control by a user for access to websites, multimedia contents and Internet services by a Policy and Charging Control Architecture. (As used herein, references to the "present invention" or "invention" relate to exemplary embodiments and not necessarily to every embodiment encompassed by the appended claims.) More specifically, the present invention is related to parental control by a user for access to websites, multimedia contents and Internet services by a Policy and Charging Control Architecture having a parental control manager "PCM" server which receives from the user monitoring criteria on Internet traffic types and corresponding actions to be carried out when any monitoring criteria fit a given Internet traffic type.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The IP-CAN (IP Connectivity Access Network) sits between RAN (Radio Access Network) and the CN (Core Network), connecting access-side signaling to the service controls in the core.

PCC (Policy and Charging Control) architecture could take decision according to the type of IP-CAN used. This scenario is depicted here (See 3GPP TS 23.203 V9.4. FIG. 5.1.1).

In FIG. 1, the most important reference elements are the following:

- PCRF (Policy and Charging Rules Function) is a functional element that performs policy control decision and flow based charging control. The PCRF provides network control regarding the service data flow detection, gating, QoS and flow based charging (except credit management) towards the PCEF.
- PCEF (Policy Control Enforcement Function) encompasses service data flow detection, policy enforcement and flow based charging functionalities. DPI (Deep Packet Inspection), embedded in PCEF, technology supports packet inspection and service classification, which consists on IP packets classified according to a configured tree of rules so that they are assigned to a particular service session.
- The Gx reference point is defined in 3GPP TS 29.212 V9.2.0 and lies between the Policy and Charging Rule Function (PCRF) and the Policy and Charging Enforcement Function (PCEF).
- The Gy reference point is defined in 3GPP TS 32.299 and 23.215 lying between the PCEF (Policy and Charging Enforcement Function) and the Online Charging System (OCS).

Parental control devices provide solutions with the ability to set limits and controls on children's usage across all wireless services. Actual parental control solutions allow end users to select a predefined content-category list that defines the contents to be monitored. Those categories are usually defined for external sources (operator, $3^{rd}$ parties) and not for end-user.

In many cases, these content-category lists do not satisfy the end-user content-filtering requirements. End users are not able to personalize their own lists for themselves. Therefore, end users adapt their needs using external tools as control parental policies in their browsers. However the intelligence of these tools is limited and usually restricted to URLs and not contents. In other occasions, these tools need to download or to access policies from content-filtering servers that cannot be adapted to end-user requirements.

The mobile operators also provide solutions for content-filtering based on Internet Content Adaptation Protocol (ICAP). ICAP allows having different levels of filtering and restricts access to inappropriate websites depending on the user profile. Some mobile operators allow that the end user chooses between different user profiles that have restricted different access to websites. This choice is usually done by a central web server or by a phone to Customer Contact Center. Anyway this solution only can restrict HTTP services (URLs and webpage content), cannot personalize the content-filtering rules and allows only choosing a set of user profiles already predefined.

BRIEF SUMMARY OF THE INVENTION

To overcome these problems, or at least to mitigate them, the present invention provides for making use of a Policy and Charging Control (PCC) architecture, upgraded with enhanced and new entities in order to provide a new method of parental control whereby users can select websites, multimedia contents and services in Internet to be restricted, or at least controlled, online in a mobile network.

To this end, the present invention provides for a Parental Control Manager (PCM) which provides an interactive system where a user can select websites, services or multimedia content to be monitored and which is arranged to notify a PCRF server about this selection; a PCRF server, which according to the PCC architecture is in charge of policy control decisions and flow based charging control, and which is enhanced to receive notifications from the Parental Control Manager (PCM) and to send new control rules to the PCEF to monitor traffic in accordance with the received notifications; and a PCEF device, which according to the PCC architecture is in charge of encompassing service data flow detection, policy enforcement and flow based charging functions, wherein this PCEF device includes a Deep Packet Inspection (DPI) module in charge of packet inspection and service classification, and wherein the PCEF device with the DPI module are enhanced to redirect the user to the Parental Control Manager (PCM) and to monitor the user traffic in accordance with new control rules received from the PCRF Server.

Also to this end, the present invention provides for a method of parental control for access to websites, multimedia contents and services in Internet, the method comprising the steps of:

a user establishing or modifying an IP Connectivity Access Network (IP-CAN) session at a PCEF device with DPI capabilities (PCEF-DPI);

the PCEF-DPI establishing or modifying a control session with a PCRF server, obtaining initial control rules for the IP-CAN session from the PCRF server, and installing the initial control rules;

the user logging-on in a Parental Control Manager (PCM) and selecting monitoring criteria on Internet traffic types and corresponding actions to be carried out when any monitoring criteria fit a given Internet traffic type;

the PCM notifying the PCRF server the selection by the user;

the PCRF server generating new control rules based on the monitoring criteria and actions selected by the user per Internet traffic type basis, and submitting these new control rules to the PCEF-DPI;

the PCEF-DPI installing the new control rules; and the PCEF-DPI inspecting and classifying Internet traffic from the user and taking corresponding actions in accordance with the new control rules; and, optionally, PCEF-DPI may notify an OCS server to charge this service.

Advantageously in this method, the Internet traffic type to be monitored may include access to websites, multimedia contents and services; whereas the monitoring criteria may include at least one of: games, messaging, VoIP, TV, video, etc; and the actions to be carried out may be any one of: dropping traffic, limiting the number of times to be accessed, allowing only a given schedule, etc.

The present invention pertains to a Parental Control Manager "PCM" server of a Policy and Charging Control "PCC" architecture with the PCM server, a Policy Control Enforcement Function device with Deep Packet Inspection capabilities "PCEF-DPI device", and a Policy Control Rules Function "PCRF" server. The PCM server comprises a user interface unit for receiving a logon from a user, and for receiving from the user monitoring criteria on Internet traffic types to be monitored for the user, and corresponding actions to be carried out when any monitoring criteria fit a given Internet traffic type. The PCM server comprises a network interface unit for submitting the monitoring criteria and corresponding actions received from the user to a PCRF server.

The present invention pertains to a PCRF server of a PCC architecture with a PCM server, a PCEF-DPI device, and a PCRF server. The PCRF server comprises a processing unit for establishing or modifying a control session with a PCEF-DPI device for an IP Connectivity Access Network (IP-CAN) session of a user, and for generating initial control rules for the IP-CAN session. The PCRF server comprises a network interface unit for submitting the initial control rules for the IP-CAN session to the PCEF-DPI device. The network interface unit arranged for receiving from a PCM server monitoring criteria on Internet traffic types to be monitored for the user, and corresponding actions to be carried out when any monitoring criteria fit a given Internet traffic type. The processing unit arranged for generating new control rules for the IP-CAN session based on the monitoring criteria and corresponding actions received from the PCM server. The network interface unit arranged for submitting the new control rules for the IP-CAN session to the PCEF-DPI device.

The present invention pertains to a PCEF-DPI device of a PCC architecture with a PCM server, the PCEF-DPI device, and a PCRF server. The PCEF-DPI device comprises a processing unit for establishing or modifying an IP-CAN session with a user, and for establishing or modifying a control session for the IP-CAN session with a PCRF server. The PCEF-DPI device comprises a network interface unit for receiving initial control rules for the IP-CAN session from the PCRF server. The processing unit arranged for installing the initial control rules. The PCEF-DPI device comprises a DPI module for inspecting and classifying Internet traffic for the user in accordance with the initial control rules. The network interface unit arranged for receiving new control rules for the IP-CAN session from the PCRF server, the new control rules based on monitoring criteria and corresponding actions selected by the user through a PCM server per Internet traffic type basis. The processing unit arranged for installing the new control rules. The DPI module arranged for inspecting and classifying Internet traffic for the user by taking corresponding actions in accordance with the new control rules.

The present invention pertains to a method of parental control by a user for access to websites, multimedia contents and Internet services with a PCC architecture having a PCM server, a PCEF-DPI device, and a PCRF server. The method comprises the steps of a user establishing or modifying an IP-CAN session at a PCEF-DPI device. There is the step of the PCEF-DPI device establishing or modifying a control session for the IP-CAN session with a PCRF server. There is the step of receiving initial control rules for the IP-CAN session at the PCEF-DPI device from the PCRF server. There is the step of installing the initial control rules at the PCEF-DPI device. There is the step of the PCEF-DPI device inspecting and classifying Internet traffic for the user in accordance with the initial control rules. There is the step of the user logging-on in a PCM server and selecting monitoring criteria on Internet traffic types and corresponding actions to be carried out when any monitoring criteria fit a given Internet traffic type. There is the step of the PCM server notifying the PCRF server the monitoring criteria and corresponding actions selected by the user. There is the step of the PCRF server generating new control rules for the IP-CAN session based on the monitoring criteria and corresponding actions selected by the user. There is the step of the PCRF server submitting these new control rules to the PCEF-DPI device. There is the step of the PCEF-DPI device installing the new control rules. There is the step of the PCEF-DPI device inspecting and classifying Internet traffic for the user by taking corresponding actions in accordance with the new control rules. Optionally, there may be a step of the PCEF-DPI device notifying an OCS server to charge this service.

BRIEF DESCRIPTION OF THE DRAWING

In the accompanying drawings, the preferred embodiment of the invention and preferred methods of practicing the invention are illustrated in which:

FIG. 7 is a diagram illustrating how user information is organized in an LDAP database.

DETAILED DESCRIPTION

Figure 4:
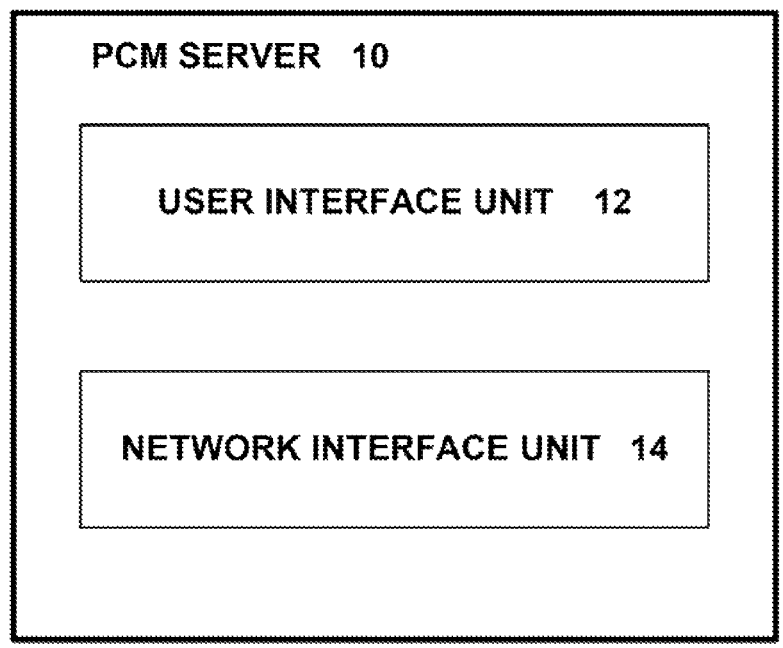
FIG. 4 is a block diagram of a PCM server.

Referring now to the drawings wherein like reference numerals refer to similar or identical parts throughout the several views, and more specifically to FIG. 4 thereof, there is shown a PCM server 10 of a PCC architecture with the PCM server 10, a PCEF-DPI device 16, a PCRF server 18 and an OCS server 30. The PCM server 10 comprises a user interface unit 12 for receiving a logon from a user, and for receiving from the user monitoring criteria on Internet traffic types to be monitored for the user, and corresponding actions to be carried out when any monitoring criteria fit a given Internet traffic type. The PCM server 10 comprises a network interface unit 14 for submitting the monitoring criteria and corresponding actions received from the user to a PCRF server 18.

The network interface unit 14 may be arranged for submitting to the PCRF server 18 monitoring criteria that include content reference and content type. The network interface unit 14 may be arranged for submitting to the PCRF server 18 content type that includes any one of: games, messaging, voice over IP "VoIP", TV, and video, and corresponding actions to be carried out that include any one of: dropping traffic, limiting a number of accesses, allowing only during a given time schedule. The network interface unit 14 may be arranged for submitting to the PCRF server 18 the content reference expressed as a Uniform Resource Locator "URL" or as a Uniform Resource Identifier "URI". The user interface unit 12 is arranged for presenting a logon web page for the user logging-on in the PCM server 10.

The user interface unit 12 may be arranged for presenting to the user a web page for selecting anyone of: an original web page, URLs to be monitored, words to be monitored, whether to drop traffic, whether to notify the user when content from an identified URL has been accessed or downloaded, a number of times that an identified URL may be accessed, time schedule when an identified URL may be accessed, whether a service access is to always be redirected to another web page in regard to the user continuing with the service access. The logon web page may be presented upon redirection of the user to the PCM server 10 from a PCEF-DPI device 16.

The present invention pertains to a method of parental control by a user for access to websites, multimedia contents and Internet services with a PCC architecture having a PCM server 10, a PCEF-DPI device 16, and a PCRF server 18. The method comprises the steps of a user establishing or modifying an IP-CAN session at a PCEF-DPI device 16. There is the step of the PCEF-DPI device 16 establishing or modifying a control session for the IP-CAN session with a PCRF server 18. There is the step of receiving initial control rules for the IP-CAN session at the PCEF-DPI device 16 from the PCRF server 18. There is the step of installing the initial control rules at the PCEF-DPI device 16. There is the step of the PCEF-DPI device 16 inspecting and classifying Internet traffic for the user in accordance with the initial control rules. There is the step of the user logging-on in a PCM server 10 and selecting monitoring criteria on Internet traffic types and corresponding actions to be carried out when any monitoring criteria fit a given Internet traffic type. There is the step of the PCM server 10 notifying the PCRF server 18 the monitoring criteria and corresponding actions selected by the user. There is the step of the PCRF server 18 generating new control rules for the IP-CAN session based on the monitoring criteria and corresponding actions selected by the user. There is the step of the PCRF server 18 submitting these new control rules to the PCEF-DPI device 16. There is the step of the PCEF-DPI device 16 installing the new control rules. There is the step of the PCEF-DPI device 16 inspecting and classifying Internet traffic for the user by taking corresponding actions in accordance with the new control rules. In particular, where a particular tariff is wanted by the operator for this service, this method may further comprise a step of the PCEF-DPI device 16 notifying the OCS server 30 in order to charge this service.

The monitoring criteria may include content reference and content type. The content type may include at least one of: games, messaging, voice over IP "VoIP", TV, and video, and wherein the corresponding actions to be carried out may include any one of: dropping traffic, limiting a number of accesses, allowing only during a given time schedule. The content reference may be expressed as a URL or as a URI.

There may be the step of presenting to the user a web page for selecting anyone of: an original web page, URLs to be monitored, words to be monitored, whether to drop traffic, whether to notify the user when content from an identified URL has been accessed or downloaded, a number of times that an identified URL may be accessed, time schedule when an identified URL may be accessed, whether a service access is to always be redirected to another web page in regard to the user continuing with the service access. The step of the user logging-on in the PCM server 10 may include a step of the user opening a HTTP connection with the PCM server 10 for logging-on therein. The step of the user logging-on in the PCM server 10 may include a step of detecting at the PCEF-DPI device 16 an Internet traffic type, such as HTTP or an application based on HTTP, to be monitored for the user in accordance with earlier monitoring criteria, a step of notifying the PCM server 10 about the Internet traffic type to be monitored for the user, and a step of presenting a logon web page for the user logging-on in the PCM server 10. For instance, if the PCEF-DPI detects an Internet traffic (VoIP, TV/radio online, games online) that needs to be blocked according to the PCM monitoring criteria, then that traffic will be dropped and notification will be sent to PCM server. Once the user opens a browser, a presenting web page for the user logging-on in the PCM server and also a notification indicating Internet traffic was dropped will be shown.

The earlier monitoring criteria may be the monitoring criteria previously received from the PCRF server 18 as part of the new control rules, or configured at the PCEF-DPI device 16, or received from the PCRF server 18 as part of the initial control rules. The step of notifying the PCM server 10 about the Internet traffic type to be monitored for the user may include a step of redirecting the user towards the PCM server 10. The step of notifying the PCM server 10 about the Internet traffic type to be monitored for the user may include a step of notifying the user of needs for logon in the PCM server 10, and a step of the user opening a HTTP connection with the PCM server 10 for logging-on therein. The Internet traffic type to be monitored may include at least one of: access to websites, multimedia contents and services. There may be a step of authenticating the user at the PCM server 10.

Figure 5:
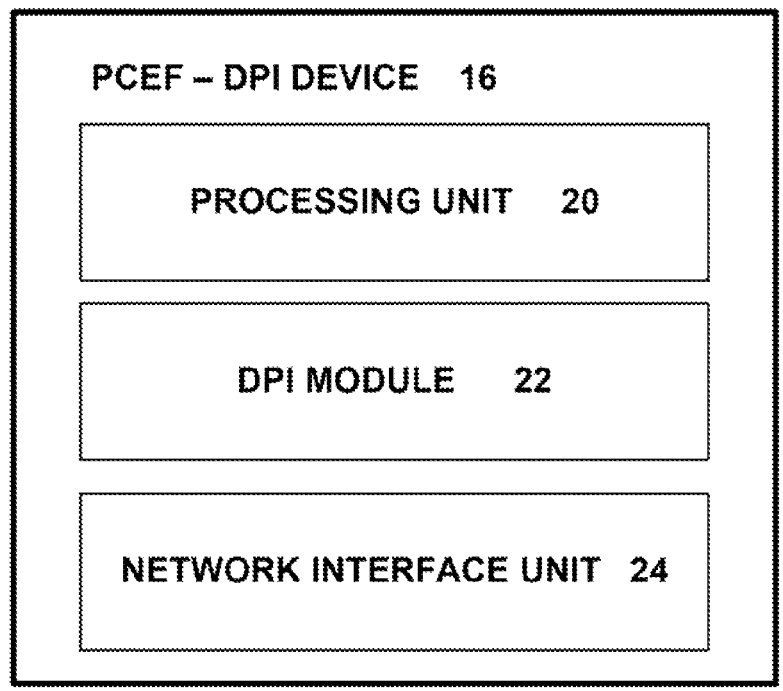
FIG. 5 is a block diagram of a PCEF-DPI device.

The present invention pertains to a PCEF-DPI device 16, as shown in FIG. 5, of a PCC architecture with a PCM server 10, the PCEF-DPI device 16, and a PCRF server 18. The PCEF-DPI device 16 comprises a processing unit 20 for establishing or modifying an IP-CAN session with a user, and for establishing or modifying a control session for the IP-CAN session with a PCRF server 18. The PCEF-DPI device 16 comprises a network interface unit 24 for receiving initial control rules for the IP-CAN session from the PCRF server 18. The processing unit 20 is arranged for installing the initial control rules. The PCEF-DPI device 16 comprises a DPI module 22 for inspecting and classifying Internet traffic for the user in accordance with the initial control rules. The network interface unit 24 is arranged for receiving new control rules for the IP-CAN session from the PCRF server 18. The new control rules are based on monitoring criteria and corresponding actions selected by the user through a PCM server 10 per Internet traffic type basis. The processing unit 20 is arranged for installing the new control rules. The DPI module 22 is arranged for inspecting and classifying Internet traffic for the user by taking corresponding actions in accordance with the new control rules. In particular, where a particular tariff is wanted by the operator for this service, the network interface unit 24 of the PCEF-DPI device 16 may be arranged for notifying the OCS server 30 in order to charge this service. Moreover, the processing unit 20 of the PCEF-DPI device 16 may be arranged for determining that a particular tariff is to be applied for this service and, responsive to this determination, the network interface unit 24 may submit the notification.

The DPI module 22 may be arranged for detecting an Internet traffic type to be monitored for the user in accordance with earlier monitoring criteria configured at storage accessible to the PCEF-DPI device 16, or received from the PCRF server 18 as part of the initial control rules, or received from the PCRF server 18 as part of the new control rules.

Figure 6:
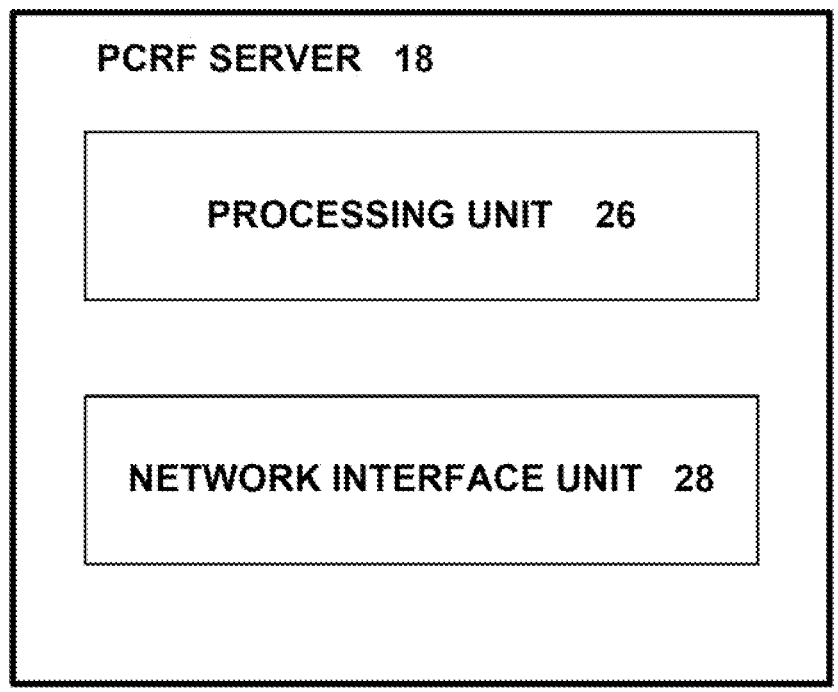
FIG. 6 is a block diagram of a PCRF server.

The present invention pertains to a PCRF server 18, as shown in FIG. 6, of a PCC architecture with a PCM server 10, a PCEF-DPI device 16, and the PCRF server 18. The PCRF server 18 comprises a processing unit 26 for establishing or modifying a control session with a PCEF-DPI device 16 for an IP-CAN session of a user, and for generating initial control rules for the IP-CAN session. The PCRF server 18 comprises a network interface unit 28 for submitting the initial control rules for the IP-CAN session to the PCEF-DPI device 16. The network interface unit 28 is arranged for receiving from a PCM server 10 monitoring criteria on Internet traffic types to be monitored for the user, and corresponding actions to be carried out when any monitoring criteria fit a given Internet traffic type. The processing unit 26 is arranged for generating new control rules for the IP-CAN session based on the monitoring criteria and corresponding actions received from the PCM server 10. The network interface unit 28 is arranged for submitting the new control rules for the IP-CAN session to the PCEF-DPI device 16.

The network interface unit 28 may be arranged for receiving from the PCM server monitoring criteria that include content reference and content type. The network interface unit 28 may be arranged for receiving from the PCM server 10 content type that includes any one of: games, messaging, voice over IP "VoIP", TV, and video, and corresponding actions to be carried out that include any one of: dropping traffic, limiting a number of accesses, allowing only during a given time schedule.

The network interface unit 28 may be arranged for receiving from the PCM server the content reference expressed as a URL or as a URI. The processing unit 20 may be arranged for generating the initial control rules for the IP-CAN session based on provisional monitoring criteria to monitor Internet traffic types for the user. These provisional monitoring criteria may be configured at the PCRF server or may be provisioned by the operator therein.

In the operation of the invention, this invention provides a new technique that gives end users or third parties the possibility to select which website, multimedia contents or services in Internet can be restricted or controlled online in a mobile network.

This invention may be implemented by using a new element in the Subscriber Profile Repository called Parental Control Manager that is going to be responsible of the following points:
- An interactive system where end-users can update the user profile with the multimedia content references to be controlled.
- Sends this user information to the PCRF via an LDAP interface or other interfaces.

Figure 2:
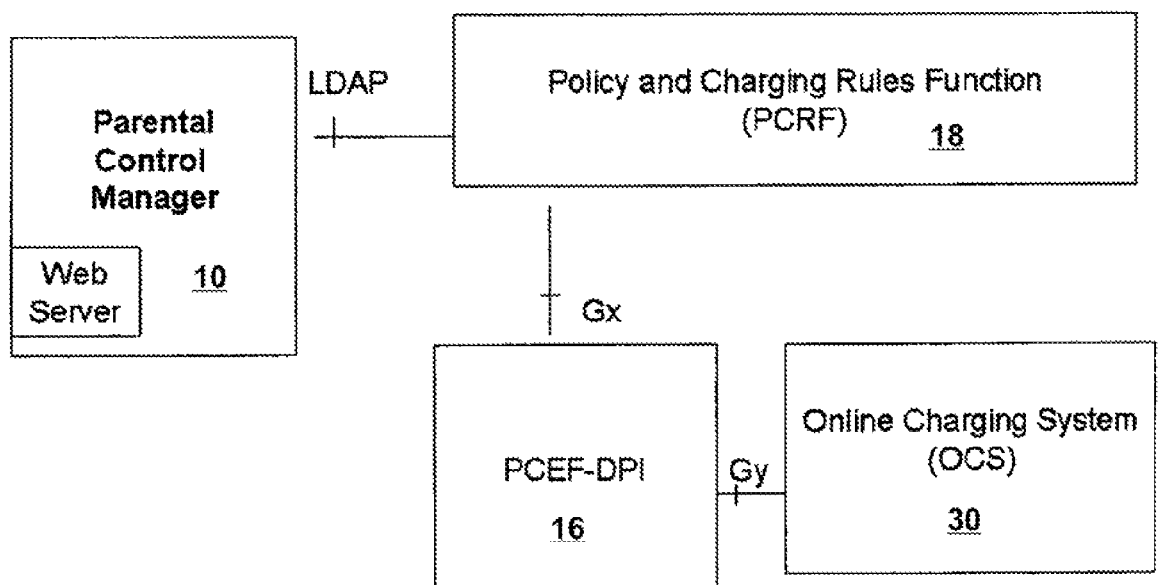
FIG. 2 shows a model architecture of the present invention.

FIG. 2 shows a model architecture regarding the present invention.

This invention also provides for a method as follows:
- First, identify the service access of a specific user thanks to the DPI technology embedded in PCEF.
- Redirect user request to an interactive system (web-server, text messaging, or multimedia messaging) (see FIG. 2) where end user can select if this service needs to be controlled or otherwise other multimedia content has to be monitored.
- In this interactive system, the end user needs to log on the system with specific user name and password (some users should not be able to access the system as for example children). Once, the user has been authorized, a graphic interface is offered to the user to configure the content to be monitored. As well as he can define the possible actions to be done by the system when this content is identified.
- According to the selection done for the user, this information is sent to the PCEF/PCRF: a new method for providing this selection is provided; whereby:
  Parental control manager sends the end-user choice (a triplet) towards the PCRF server the following three attributes (a triplet)
  Multimedia content reference (URL or similar)
  Actions to be applied
  Content-type (file, streaming, web access, VoIP call, instant messaging)

Optionally, weekly days or dates where these services are going to be monitored and it may also indicate how long the user wants to apply this monitoring.

Figure 1:
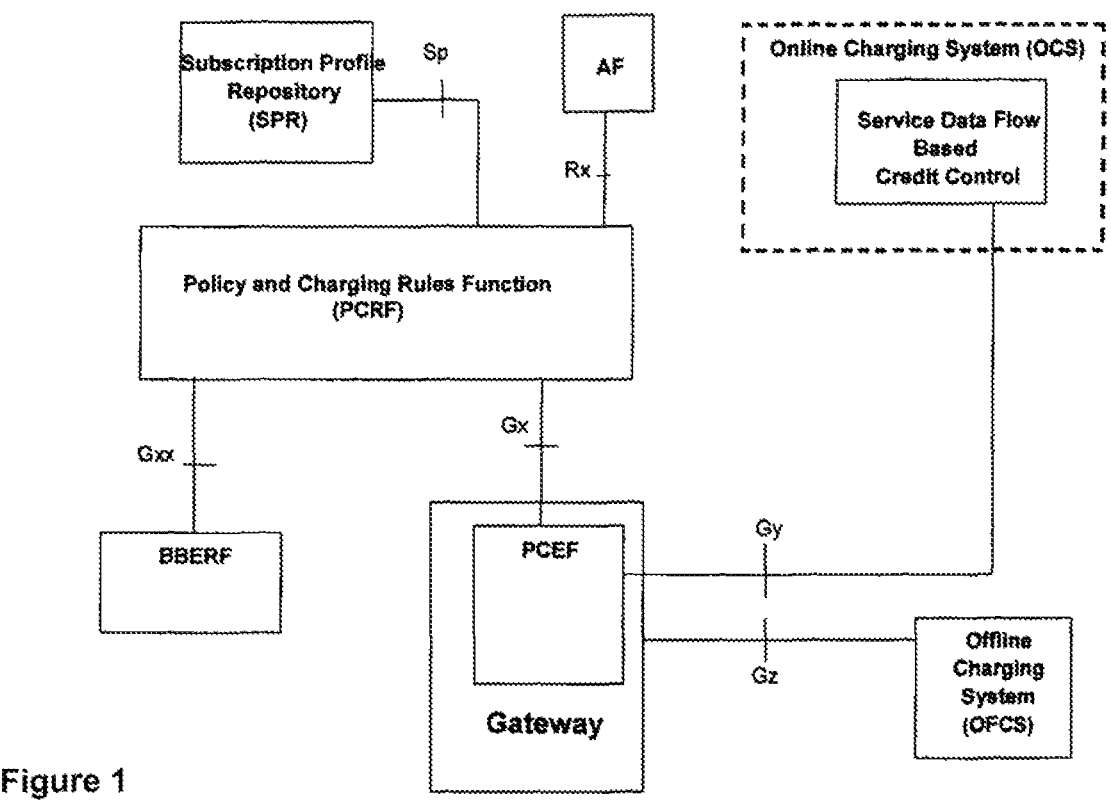
FIG. 1 shows a PCC architecture.
Figure 3:
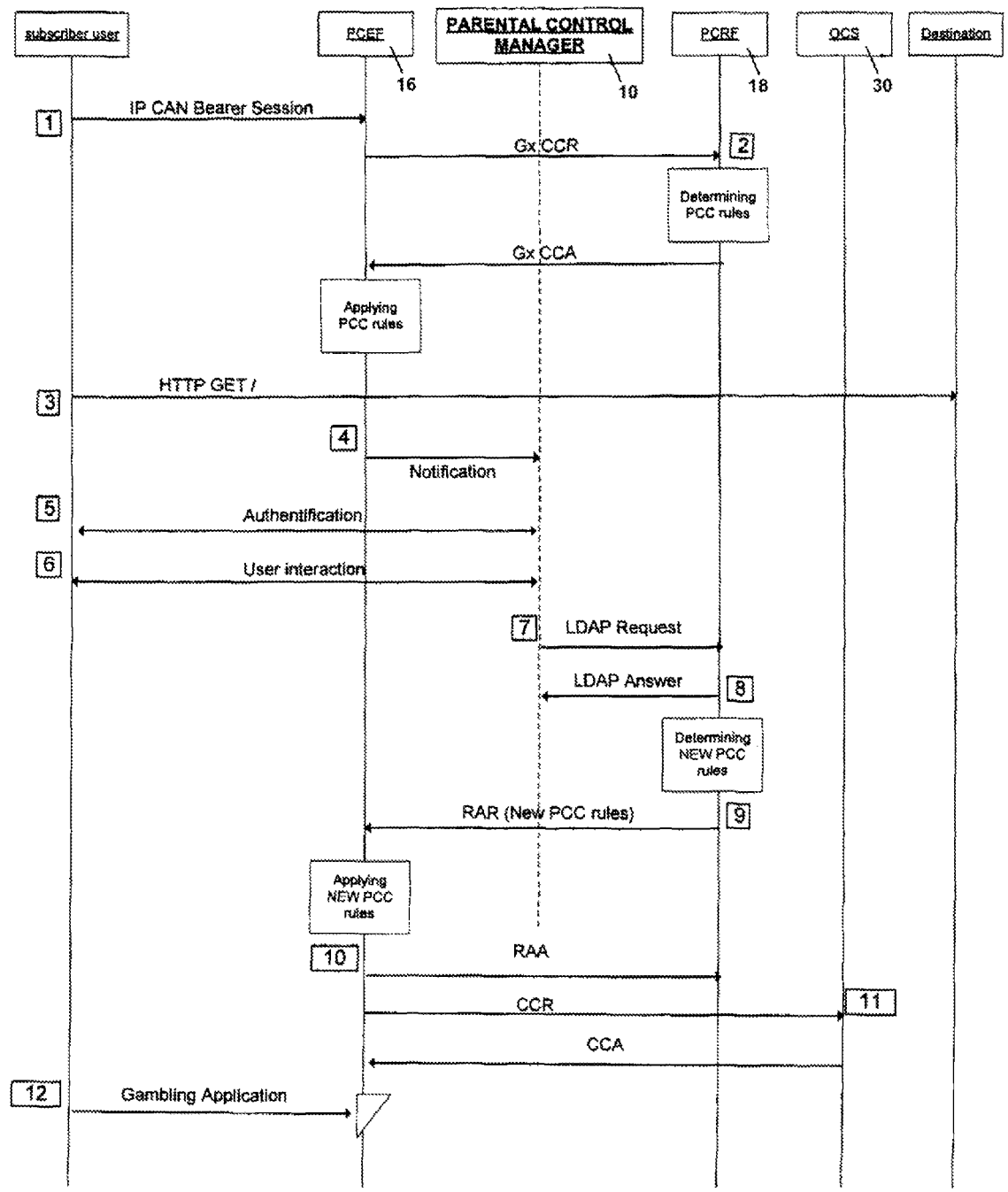
FIG. 3 shows the steps of the present invention.

There may be several nodes involved in the invention.
Subscriber user: communication originator
Destination: user/server that is going to be called
PCEF: embeds DPI technology to analyze the communication and determine user bandwidth
PCRF: according to info provided by PCEF decides if this user has to be provided with a new IP-CAN Bearer
OCS: this element is the Online Charging System (see FIG. 1)
Parental Control Manager: responsible of providing an interactive system where end-user selects the services or multimedia content to be monitored and also notifies to PCRF FIG. 3 describes every step in the invention technique. Diameter protocol has been chosen for communication between PCEF and PCRF and between PCEF and OCS but it also could be adapted for other protocols. LDAP protocol has been selected in the interface between user profile configuration manager and PCRF but other protocols could be used.

1. The user logons into the core packet network. When the user connects to the network, establishes a first IP-CAN session at a PCEF with DPI capabilities (PCEF-DPI) or modifies an existing IP-CAN session. Depending on the solution chosen on step 3, the user could need to browse an operator internal web page to confirm the network access. PCEF requests the PCC rules to PCRF. PCRF returns the PCC rules to be applied for IP CAN bearer traffic.
2. PCEF establishes, or modifies, with PCRF a control session with the default rules loaded.
3. End user requests a webpage from a Internet web server
4. PCEF with DPI capabilities detects what service the user is using. PCEF is configured to notify the traffic use to the Parental Control Manager. This notification can be implemented in several ways. One proposal is to redirect user request to a web server (a redirection based on HTTP protocol) However this option is only valid for HTTP services. If user is running an application not based on HTTP (Skype, video streaming, VoIP, Instant messaging, gambling application or mobile games) then another approach could be that previously the user opens a HTTP connection to Parental Control Manager (web server). This connection may be updated based on Parental Control Manager notifications.
5. End User logons in Parental Control Manager. Initially the end user may need to be authenticated to avoid misusing. For example, the user introduces a username/password that already has been sent by email or telephone from Customer Contact Centre.
6. Once user is authenticated, a webpage offers a HTTP form with different options.

a. If the user was browsing in step 4, the Parental Control Manager could offer to select the original webpage to be monitored or also what webpages (URLs) the user wants to be monitored o even what words in the URL string or in the webpage content have to be monitored (e.g.: sex, gambling, bulimia, colon, cancer, etc). Once this is selected, the user could also have the chance to define the action that wants to apply:
  i. Drop traffic
  ii. Notify him (by mail or SMS) when contents from these URLs are been accessed or downloaded
  iii. Limit the number of times that those URLs can be accessed
  iv. During a time range or time schedule (weekends, 9 pm-8 am Monday-Tuesday, etc.)
  v. Always redirect to another web page This is an example about what the user could select:
Do you want to monitor the webpage <Original_URL>?
Do you want to monitor other webpages? Please enter URLs:
Do you want to monitor URLs or webpage content based on some strings? Please introduce the strings (e.g.: porno, sex, cancer, etc)

b. The user can also have the possibility to restrict other services that are predefined for the operator: VoIP, games, gambling applications, TV Online or video streaming. The user can also choose time schedule/dates to enable/disable these applications. Similar actions can also be selected to be applied in these applications:
  i. Drop traffic
  ii. Notify him (by mail or SMS) when contents from these URLs are been accessed or downloaded
  iii. Limit the number of times that those applications can be accessed
  iv. During a time range or time schedule (weekends, 9 pm-8 am Monday-Tuesday, etc.)

This is an example about what the customer could select:
Do you want to monitor some of the following applications?
Mobile games
Online games
Gambling
Instant messaging
VoIP applications (Skype)
TV online
Youtube
Flash streaming videos c. As we already commented in step 5 if the user is running an application not based on HTTP (Skype, video streaming, VoIP, Instant messaging, gambling application or mobile games) then the user could receive notifications from the Parental Control Manager to the browser. These notifications will ask the user if this application should be restricted and, if so, what actions to be done (same actions as step b describes)

7. Parental Control Manager notifies this selection to the PCRF via LDAP interface by a ModifyRequest (LDAP). The LDAP message contains the selected services/words/urls, actions to be applied. Those words can be configured using regular expressions like URLs (containing this word at the end, at the beginning in the middle, etc). Optionally, it may also contain the time to apply this monitoring or/and the action by default. The following diagram represents how the user information is organized in the LDAP instructions from database.

8. PCRF answers this request via LDAP confirming this change (ModifyResponse in LDAP).
9. PCRF sends the new PCC rules to be applied for IP CAN bearer traffic via Gx interface using RAR message in Diameter protocol to PCEF. This new PCC rules may contain the selected URLs, services and actions to be done by this new PCC rules. Optionally, PCRF could also notify the time to apply the new rules. Optionally, PCRF could also send new rating groups to extra charge these changes.
10. PCEF acknowledges the message sent by PCRF and installs the new rules.
11. PCEF may send the new rating group towards OCS to charge this service and OCS answers this message.
12. End user traffic is inspected in PCEF and classified as the content-type initially detected. This content-type traffic will be monitored with the new rules selected. Based on the actions, this content-type traffic may be dropped (please step 6 for more information about actions).

This invention could be also used for:
  Law agencies: Deny or monitor the access to forbidden or sensible contents in a given country.
  Companies: blocking basic words like gambling, games, etc
  Parents: filtering access to some contents (ex: filtering anorexia, bulimia)
  End-users can personalize the contents, webpages, applications that want to be monitored and restricted. They do not have to choose content-filtering profiles but they can select the URL, strings, contents, applications to be filtered and even the time schedule where they will be monitored or restricted.
  End-users have the chance to choose online those contents they want to monitor and to restrict.
  Operators can launch marketing campaigns offering personalized parent control services to different tariffs.
  Operator can make agreements with $3^{rd}$ parties applications to provide external content and words more used by their end users

ABBREVIATIONS

3GPP Third Generation Partners Project
AVP Attribute Value Pair
AF Application Function
AoC Advice of Charge
CCR Credit Control Request
CCA Credit Control Answer
CN Core Network
DPI Deep Packet Inspection
HTTP Hyper Text Transfer Protocol
ICAP Internet Content Adaptation Protocol
IMS IP Multimedia System
IP-CAN IP Connectivity Access Network
MBR Maximum Bitrates
PCEF Policy Control Enforcement Function
PCRF Policy Control Resource Function
QoS Quality of Service
RAN Radio Access Network
SDP Session Description Protocol
VoIP Voice over IP Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method of parental control by a user for access to websites, multimedia contents and Internet services, the method carried out with a Policy and Charging Control "PCC" architecture having a Parental Control Manager "PCM" server, a Policy Control Enforcement Function device with Deep Packet Inspection capabilities "PCEF-DPI device", and a Policy Control Rules Function "PCRF" server, the method including the steps of:
    a user establishing or modifying an IP Connectivity Access Network (IP-CAN) session at a PCEF-DPI device;
    the PCEF-DPI device establishing or modifying a control session for the IP-CAN session with a PCRF server;
    receiving initial control rules for the IP-CAN session at the PCEF-DPI device from the PCRF server;
    installing the initial control rules at the PCEF-DPI device;
    the PCEF-DPI device inspecting and classifying Internet traffic for the user in accordance with the initial control rules;
    detecting at the PCEF-DPI device an Internet traffic type to be monitored for the user in accordance with monitoring criteria;
    the PCEF-DPI device notifying a PCM server about the Internet traffic type to be monitored for the user;
    presenting a logon web page for the user logging-on in the PCM server;
    the user logging-on in the PCM server and selecting further monitoring criteria on Internet traffic types and corresponding actions to be carried out when any further monitoring criteria fit a given Internet traffic type;
    the PCM server notifying the PCRF server of the further monitoring criteria and corresponding actions selected by the user;
    the PCRF server generating new control rules for the IP-CAN session based on the further monitoring criteria and corresponding actions selected by the user and received from the PCM server;
    the PCRF server submitting these new control rules to the PCEF-DPI device;
    the PCEF-DPI device installing the new control rules; and
    the PCEF-DPI device inspecting and classifying Internet traffic for the user by taking corresponding actions in accordance with the new control rules.

2. The method of claim 1, wherein at least the further monitoring criteria include content reference and content type.

3. The method of claim 2, wherein the content type includes at least one of: games, messaging, voice over IP "VoIP", TV, and video, and wherein the corresponding actions to be carried out include any one of: dropping traffic, limiting a number of accesses, allowing only during a given time schedule.

4. The method of claim 3, wherein the content reference is expressed as a Uniform Resource Locator "URL" or as a Uniform Resource Identifier "URI".

5. The method of claim 4, further including a step of presenting to the user a web page for selecting anyone of: an original web page, URLs to be monitored, words to be monitored, whether to drop traffic, whether to notify the user when content from an identified URL has been accessed or downloaded, a number of times that an identified URL may be accessed, time schedule when an identified URL may be accessed, whether a service access is to always be redirected to another web page in regard to the user continuing with the service access.

6. The method of claim 1, wherein the step of the user logging-on in the PCM server includes a step of the user opening a HTTP connection with the PCM server for logging-on therein.

7. The method of claim 1, wherein the monitoring criteria are the further monitoring criteria received from the PCRF server as part of the new control rules, or configured at the PCEF-DPI device, or previously received from the PCRF server as part of the initial control rules.

8. The method of claim 1, wherein the step of notifying the PCM server about the Internet traffic type to be monitored for the user includes a step of redirecting the user towards the PCM server.

9. The method of claim 1, wherein the step of notifying the PCM server about the Internet traffic type to be monitored for the user includes a step of notifying the user of needs for logon in the PCM server, and a step of the user opening a HTTP connection with the PCM server for logging-on therein.

10. The method of claim 1, wherein the Internet traffic type to be monitored includes at least one of: access to websites, multimedia contents and services.

11. The method of claim 1, further including a step of authenticating the user at the PCM server.

12. A Policy Control Enforcement Function device with Deep Packet Inspection capabilities "PCEF-DPI device" of a Policy and Charging Control "PCC" architecture with a Parental Control Manager "PCM" server for use with an Internet, the Policy Control Enforcement Function device with Deep Packet Inspection capabilities "PCEF-DPI device", and a Policy Control Rules Function "PCRF" server, the PCEF-DPI device comprising:
    a non-transitory memory containing instructions executable by a processor; a processor arranged to establish or modify an IP Connectivity Access Network (IP-CAN) session with a user, and to establish or modify a control session for the IP-CAN session with a PCRF server;
    a network interface arranged to receive initial control rules for the IP-CAN session from the PCRF server through the Internet;
    the processor arranged to install the initial control rules;
    a DPI machine arranged to inspect and classify Internet traffic for the user in accordance with the initial control rules, and to detect an Internet traffic type to be monitored for the user in accordance with monitoring criteria;
    the network interface being arranged to notify a PCM server about the Internet traffic type to be monitored for the user;
    the network interface arranged to receive new control rules for the IP-CAN session from the PCRF server, the new control rules generated by the PCRF server and based on further monitoring criteria and corresponding actions selected by the user through the PCM server per Internet traffic type basis;
    the processor being arranged to install the new control rules; and
    the DPI machine being arranged to inspect and classifying Internet traffic for the user by taking corresponding actions in accordance with the new control rules.

13. The PCEF-DPI device of claim 12, wherein the monitoring criteria are configured at non-transitory storage accessible to the PCEF-DPI device, or previously received from the PCRF server as part of the initial control rules, or received from the PCRF server as part of the new control rules.

14. A Parental Control Manager "PCM" server of a Policy and Charging Control "PCC" architecture with the Parental Control Manager "PCM" server, a Policy Control Enforcement Function device with Deep Packet Inspection capabilities "PCEF-DPI device" used in an Internet, and a Policy Control Rules Function "PCRF" server, the PCM server comprising:
- non-transitory memory;
- a network interface arranged to receive a notification from a PCEF-DPI device through the Internet about an Internet traffic type to be monitored for the user and store the notification in the non-transitory memory;
- a user interface arranged to present a logon web page for the user logging-on in the PCM server;
- the user interface being arranged to receive a logon from a user, and to receive from the user further monitoring criteria on Internet traffic types to be monitored for the user, and corresponding actions to be carried out when any further monitoring criteria fit a given Internet traffic type; and
- the network interface being arranged to submit the further monitoring criteria and corresponding actions received from the user to a PCRF server through the Internet.

15. The PCM server of claim 14, wherein the network interface is arranged to submit to the PCRF server the further monitoring criteria that include content reference and content type stored in the non-transitory memory.

16. The PCM server of claim 15, wherein the network interface is arranged to submit to the PCRF server content type that includes any one of: games, messaging, voice over IP "VoIP", TV, and video, and corresponding actions to be carried out that include any one of: dropping traffic, limiting a number of accesses, allowing only during a given time schedule.

17. The PCM server of claim 15, wherein the network interface is arranged to submit to the PCRF server the content reference expressed as a Uniform Resource Locator "URL" or as a Uniform Resource Identifier "URI".

18. The PCM server of claim 14, wherein the user interface is arranged to present to the user a web page for selecting anyone of: an original web page, URLs to be monitored, words to be monitored, whether to drop traffic, whether to notify the user when content from an identified URL has been accessed or downloaded, a number of times that an identified URL may be accessed, time schedule when an identified URL may be accessed, whether a service access is to always be redirected to another web page in regard to the user continuing with the service access.

19. The PCM server of claim 14, wherein the logon web page is presented upon redirection of the user to the PCM server from the PCEF-DPI device.

20. A Policy Control Rules Function "PCRF" server of a Policy and Charging Control "PCC" architecture with a Parental Control Manager "PCM" server, a Policy Control Enforcement Function device with Deep Packet Inspection capabilities "PCEF-DPI device" for use with an Internet, and the Policy Control Rules Function "PCRF" server, the PCRF server comprising:
- a non-transitory memory containing instructions executable by a processor;
- the processor being arranged to establish or modify a control session with a PCEF-DPI device for an IP Connectivity Access Network (IP-CAN) session of a user, and to generate initial control rules for the IP-CAN session based on monitoring criteria to monitor Internet traffic types for the user;
- a network interface arranged to submit the initial control rules for the IP-CAN session to the PCEF-DPI device through the Internet;
- the network interface being arranged to receive from a PCM server through the Internet further monitoring criteria selected by the user on Internet traffic types to be monitored for the user, and corresponding actions selected by the user and to be carried out when any further monitoring criteria fit a given Internet traffic type;
- the processor being arranged to generate new control rules for the IP-CAN session based on the further monitoring criteria and corresponding actions received from the PCM server; and
- the network interface being arranged to submit the new control rules for the IP-CAN session to the PCEF-DPI device.

21. The PCRF server of claim 20, wherein the network interface is arranged to receive from the PCM server the further monitoring criteria that include content reference and content type to be stored in non-transitory storage.

22. The PCRF server of claim 21, wherein the network interface is arranged to receive from the PCM server the content type that includes any one of: games, messaging, voice over IP "VoIP", TV, and video, and corresponding actions to be carried out that include any one of: dropping traffic, limiting a number of accesses, allowing only during a given time schedule.

23. The PCRF server of claim 21, wherein the network interface is arranged to receive from the PCM server the content reference expressed as a Uniform Resource Locator "URL" or as a Uniform Resource Identifier "URI".

\* \* \* \* \*

UNITED STATES PATENT AND TRADEMARK OFFICE
CERTIFICATE OF CORRECTION

PATENT NO. : 8,949,928 B2
APPLICATION NO. : 13/166275
DATED : February 3, 2015
INVENTOR(S) : Perez Martinez et al.

Page 1 of 1

It is certified that error appears in the above-identified patent and that said Letters Patent is hereby corrected as shown below:

In the Specification

In Column 7, Line 23, delete "PCM server" and insert -- PCM server 10 --, therefor.

In Column 7, Line 32, delete "PCM server" and insert -- PCM server 10 --, therefor.

Signed and Sealed this
Seventh Day of July, 2015

Michelle K. Lee
*Director of the United States Patent and Trademark Office*